(12) United States Patent
Kawasaki

(10) Patent No.: US 7,810,732 B2
(45) Date of Patent: Oct. 12, 2010

(54) BARCODE READING MECHANISM AND BARCODE READING METHOD

(75) Inventor: Toshimitsu Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 12/007,112

(22) Filed: Jan. 7, 2008

(65) Prior Publication Data
US 2008/0185440 A1    Aug. 7, 2008

(30) Foreign Application Priority Data
Jan. 12, 2007    (JP)    ............... 2007-004918

(51) Int. Cl.
*G06K 7/10*    (2006.01)
(52) U.S. Cl. ................................. 235/462.43
(58) Field of Classification Search ............ 235/462.43, 235/462.14, 462.49, 472.01, 472.03, 462.45
See application file for complete search history.

(56) References Cited

U.S. PATENT DOCUMENTS

| | | | | |
|---|---|---|---|---|
| 3,918,028 A | * | 11/1975 | Humphrey et al. | .......... 382/313 |
| 4,074,114 A | * | 2/1978 | Dobras | ................... 235/462.07 |
| 4,457,719 A | * | 7/1984 | Dittakavi et al. | ............ 434/159 |
| 5,059,772 A | | 10/1991 | Younglove | |
| 5,323,327 A | * | 6/1994 | Carmichael et al. | ......... 700/215 |
| 5,403,140 A | | 4/1995 | Carmichael et al. | |
| 5,430,558 A | * | 7/1995 | Sohaei et al. | ................ 358/473 |
| 5,533,594 A | * | 7/1996 | Tremblay et al. | ........... 187/201 |
| 5,567,927 A | * | 10/1996 | Kahn et al. | ............. 235/462.01 |
| 5,574,272 A | * | 11/1996 | Seo et al. | ..................... 235/454 |
| 5,723,859 A | * | 3/1998 | Kerschner et al. | ........... 250/234 |
| 5,872,751 A | * | 2/1999 | Utsumi et al. | ............. 369/30.29 |
| 5,923,444 A | * | 7/1999 | Bohn | ........................ 358/473 |
| 6,036,094 A | * | 3/2000 | Goldman et al. | ....... 235/462.45 |
| 6,064,543 A | * | 5/2000 | Tatsuda | ..................... 360/92.1 |
| 6,396,657 B1 | * | 5/2002 | Suzuki | ...................... 360/92.1 |
| 6,420,792 B1 | * | 7/2002 | Guldi et al. | ................. 257/797 |
| 6,466,396 B1 | | 10/2002 | Egan et al. | |
| 2007/0165321 A1 | * | 7/2007 | Hashimoto | ................... 360/69 |

FOREIGN PATENT DOCUMENTS

| | | |
|---|---|---|
| JP | 2000-268458 | 9/2000 |
| JP | 2003-288541 | 10/2003 |

OTHER PUBLICATIONS

European Office Action and Search Report dated Sep. 9, 2008.

* cited by examiner

*Primary Examiner*—Michael G Lee
*Assistant Examiner*—Suezu Ellis
(74) *Attorney, Agent, or Firm*—McGinn IP Law Group, PLLC (57) ABSTRACT

A reading unit having a light emitting portion for irradiating a barcode with irradiation light and a light receiving portion for receiving reflected light of the irradiation light from the barcode, a supporting member for turnably supporting the reading unit on a rotating shaft so that the position of the optical axis of the irradiation light is moved in the length direction of bars constituting the barcode, and a roller and a slanting surface for moving the optical axis of the irradiation light in the bar length direction by turning the reading unit.

11 Claims, 9 Drawing Sheets

BARCODE READING MECHANISM AND BARCODE READING METHOD

This application is based upon and claims the benefit of priority from Japanese patent application No. 2007-004918, filed on Jan. 12, 2007, the disclosure of which is incorporated herein in its entirety by reference.

BACKGROUND OF THE INVENTION

1. Field of the Invention

The present invention relates to a barcode reading mechanism and method for reading, for example, a barcode on a barcode label attached to an item.

2. Description of the Related Art

For example, Japanese Patent Laid-Open No. 2003-288541 discloses a barcode reader having a barcode reading unit which reads a barcode on a barcode label attached to an item by applying a scanning beam of irradiation light to the barcode.

In general, in a barcode reading unit of this kind, there is a need to tilt the optical axis of irradiation light applied to a barcode at a predetermined angle from a direction perpendicular to the barcode label attachment surface in order to prevent a read error due to diffused reflection on the barcode. Barcode labels are standardized in sizes in the length direction of bars constituting the barcode and in the direction of arrangement of the barcode bars.

The position of the optical axis of irradiation light from a barcode reading unit in the barcode bar length direction and the tilting angle of the optical axis vary due to causes in the manufacturing process. For example, if the tilting angle of the optical axis of irradiation light is larger than a set value, the position at which a barcode label is irradiated with irradiation light is shifted in the bar length direction as the distance between the attachment surface of the barcode label and the position of the light emitting portion from which irradiation light is applied to the barcode label is increased. In such a situation, there is a possibility of the bar code reading unit applying irradiation light to such a position that deviates from the attachment surface of the barcode label to cause a read error. In conventional barcode reading units, therefore, it is necessary to adjust the tilting angle of the optical axis of irradiation light with respect to a barcode label.

In a case where the tilting angle of the optical axis of irradiation light from a barcode reading unit is adjusted, the barcode reading unit is set in an adjustment mechanism capable of adjusting the optical axis of irradiation light, and the position of the optical axis of irradiation light in the length direction of barcode bars and the tilting angle of the optical axis of irradiation light are measured. The thickness of an adjusting plate for adjusting the tilting angle of the optical axis of irradiation light is computed on the basis of the results of this measurement. The tilting angle of the optical axis of irradiation light from each individual barcode reading unit is adjusted by attaching an adjusting plate of the desired thickness to the barcode reading unit. In this way, the position of irradiation light in the bar length direction on a barcode label is adjusted.

As described above, the position at which a barcode is irradiated with irradiation light from each barcode reading unit is adjusted by measuring the tilting angle of the optical axis of irradiation light and by using an adjusting plate whose thickness is suitable for adjustment of the tilting angle. Adjustment in such a way requires cumbersome operations and a comparatively long adjustment time.

Moreover, individual barcode reading units vary one from another in the position of the optical axis of irradiation light in the barcode bar length direction, and in the tilting angle of the optical axis of irradiation light. Therefore there is a need to prepare a plurality of kinds of adjusting plates of different thicknesses and to perform adjusting operations using the adjusting plates, and the adjustment operations are cumbersome.

SUMMARY OF THE INVENTION

An object of the present invention is to provide a barcode reading mechanism and method which enable reading of a barcode by moving the optical axis of irradiation light in the length direction of bars constituting the barcode while eliminating the need for an operation for adjusting the optical axis of irradiation light.

To achieve the above-described object, according to the present invention, there is provided a barcode reading mechanism including a reading unit including a light emitting portion for irradiating a barcode with irradiation light and a light receiving portion for receiving reflected light of the irradiation light from the barcode, unit supporting means for turnably supporting the reading unit so that the position of the optical axis of the irradiation light is moved in the length direction of bars constituting the barcode, and optical axis moving means for moving the optical axis of the irradiation light in the bar length direction by turning the reading unit.

In the barcode reading mechanism according to the present invention arranged as described above, the reading unit supported by the unit supporting means is turned by the optical axis moving means to move the position of the optical axis of irradiation light emitted from the light emitting portion of the reading unit in the bar length direction of the barcode. The barcode reading mechanism thus moves the optical axis of irradiation light in the bar length direction of the barcode to enable reading of the barcode.

In a barcode reading method according to the present invention, a reading unit including a light emitting portion for irradiating a barcode with irradiation light, and a light receiving portion for receiving reflected light of the irradiation light from the barcode is turned about a rotating shaft to move the optical axis of the irradiation light in the length direction of bars constituting the barcode, and the barcode is read by moving the optical axis in this way.

According to the present invention, the reading unit is turned about the rotating shaft to move the position of the optical axis of irradiation light in the bar length direction of the barcode, thereby enabling reading of the barcode while eliminating the need for an optical axis adjusting operation.

DETAILED DESCRIPTION OF THE PREFERRED EMBODIMENT

An exemplary embodiment of the present invention will be described with reference to the accompanying drawings.

A barcode reading mechanism according to the exemplary embodiment is applied to an information recording apparatus using a magnetic tape cartridge, i.e., a tape library apparatus.

The tape library apparatus not shown has a cartridge rack in which a plurality of magnetic tape cartridges having information stored therein are housed, a cartridge handling mechanism which selects the desired one of the magnetic tape cartridges from the cartridge rack and handles the selected magnetic tape cartridge, and a biaxial drive mechanism which drives the cartridge handling mechanism along two axes relative to the cartridge rack.

A barcode label on which a barcode is printed is attached to an outer peripheral surface of each magnetic tape cartridge, and the magnetic tape cartridges are managed by means of the barcodes. The cartridge rack has housing sections in rack form in which the plurality of magnetic tape cartridges are disposed. For example, the housing sections form three levels: upper, middle and lower levels in the vertical direction and three columns in the horizontal direction. Each magnetic tape cartridge is housed in each housing section, with the barcode label facing outward of the cartridge rack.

Figure 1:
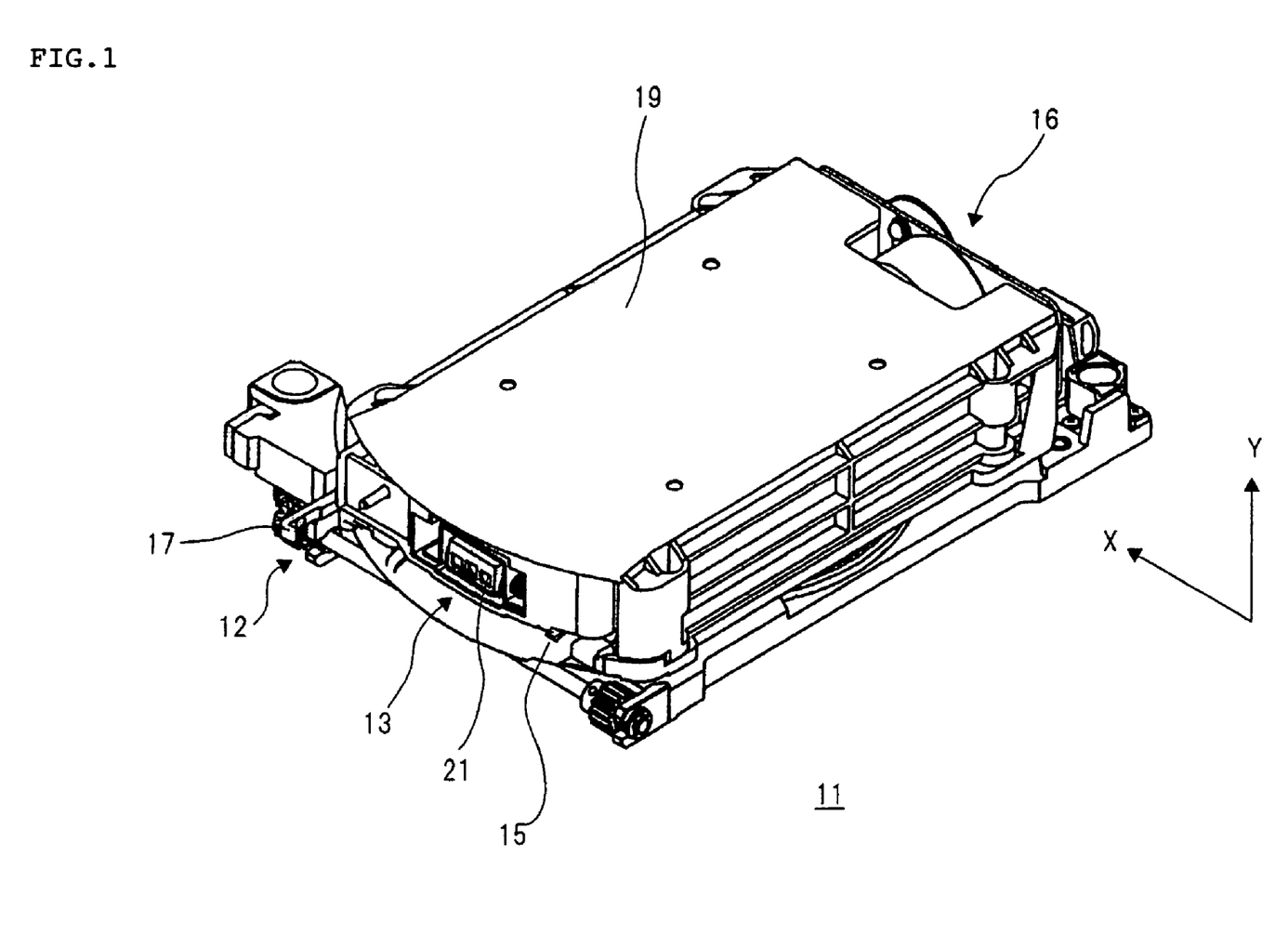
FIG. 1 is a perspective view of a cartridge handling mechanism to which a barcode reading mechanism according to an exemplary embodiment of the present invention is applied.
Figure 2:
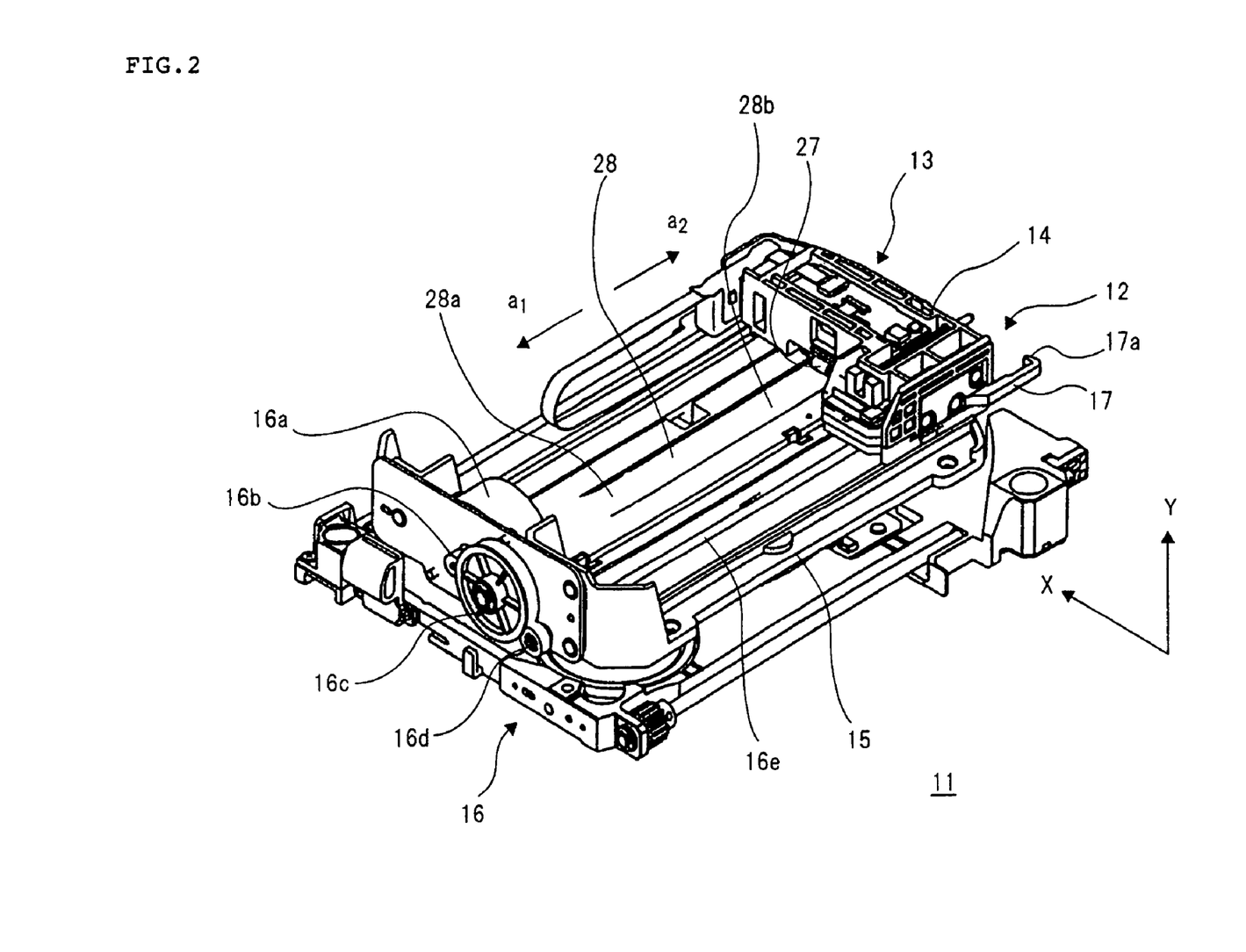
FIG. 2 is an exploded perspective view of the cartridge handling mechanism.

As shown in FIGS. 1 and 2, cartridge handling mechanism 11 is movable in an X-axis direction corresponding to a horizontal direction and in a Y-axis direction corresponding to a vertical direction by the above-mentioned biaxial drive mechanism (not shown). Cartridge handling mechanism 11 has cartridge holding mechanism 12 which holds one of the magnetic tape cartridges, barcode reading mechanism 13 which reads the barcode, a feed block 14 which supports cartridge holding mechanism 12 and barcode reading mechanism 13, support base 15 which supports feed block 14 so that feed block 14 is movable in the directions of arrow $a_1$ and $a_2$, block moving mechanism 16 which drives feed block 14, and top lid member 19 mounted on support base 15 so as to cover the area through which mechanisms 12 and 13 and feed block 14 move.

Figure 3:
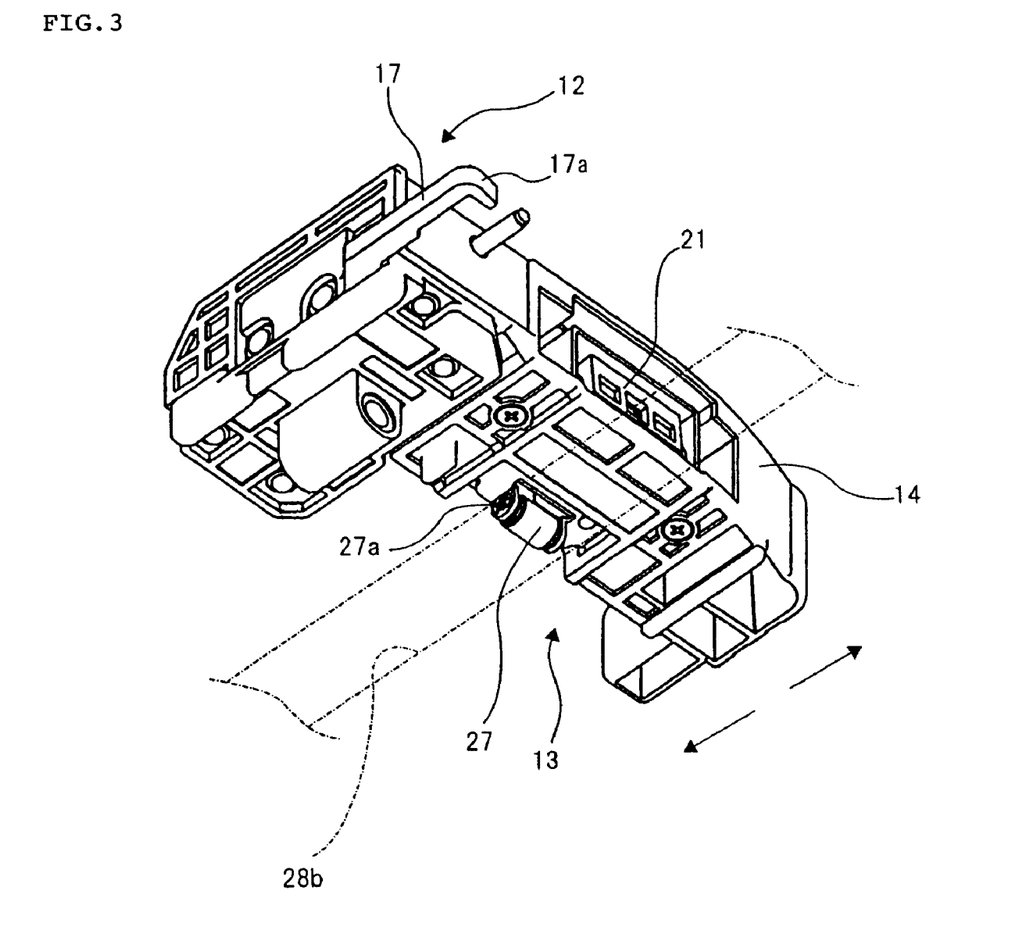
FIG. 3 is a bottom-side perspective view of the cartridge holding mechanism and of a barcode reading mechanism.

As shown in FIG. 3, cartridge holding mechanism 12 is placed on feed block 14 and has holding arm 17 with holding claw 17a capable of catching a side surface of one of the magnetic tape cartridges, and a drive mechanism (not shown) which drives holding arm 17. Cartridge holding mechanism 12 catches the desired one of the magnetic tape cartridges with holding claw 17a of holding arm 17, and feed block 14 is thereafter moved in the direction of arrow $a_1$, thereby mounting on support base 15 the magnetic tape cartridge held by holding arm 17.

Figure 4:
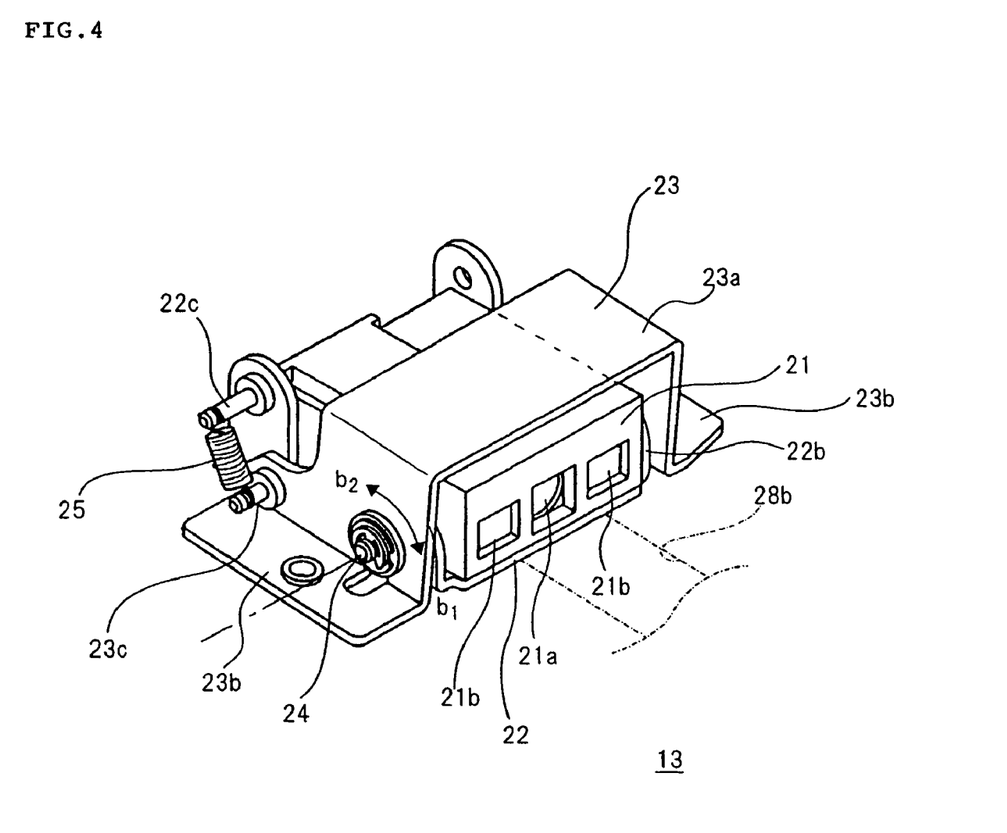
FIG. 4 is a perspective view of the barcode reading mechanism.
Figure 5:
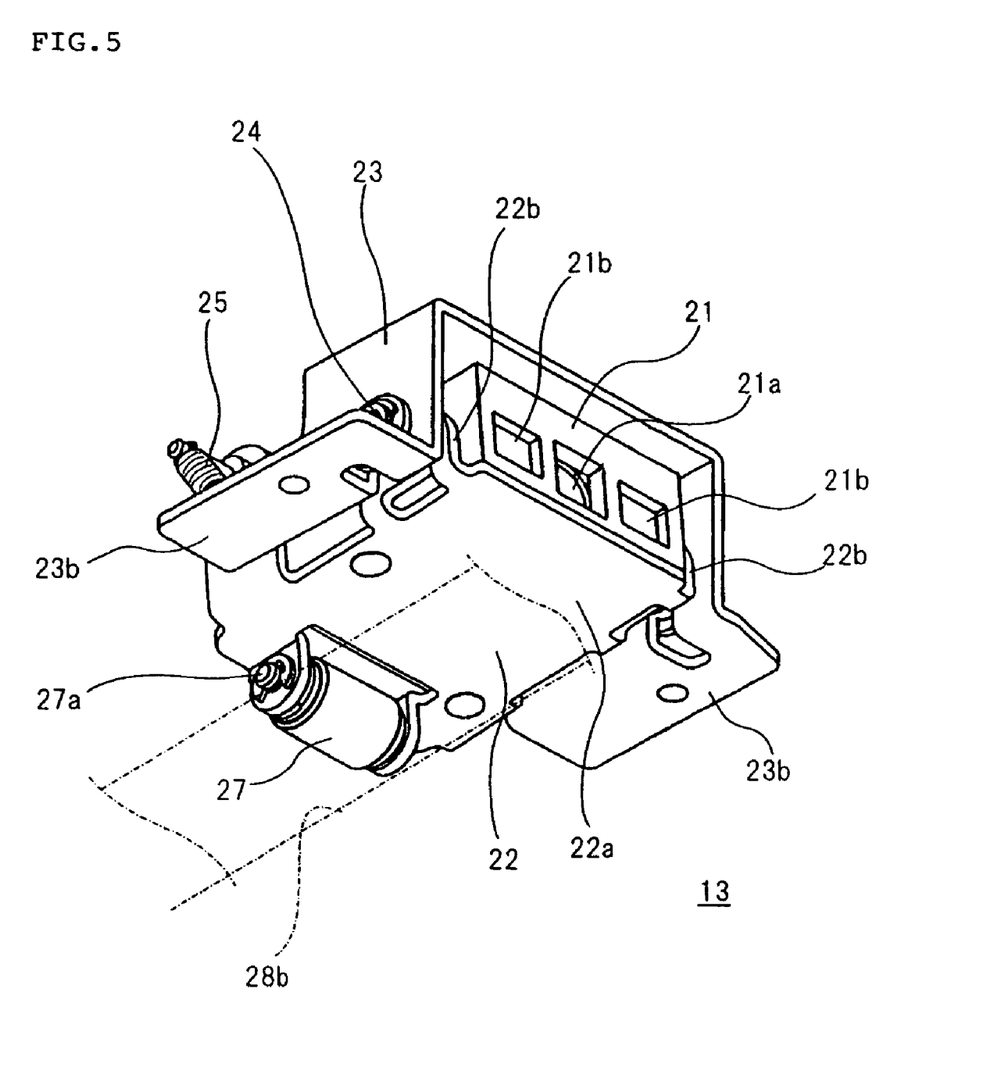
FIG. 5 is a bottom-side perspective view of the barcode reading mechanism.

As shown in FIGS. 4 and 5, barcode reading mechanism 13 has reading unit 21 for reading the barcode, mount member 22 on which reading unit 21 is mounted, supporting member 23 which supports mount member 22 by rotating shaft 24 so that mount member 22 is turnable on rotating shaft 24 in each of the directions of arrows $b_1$ and $b_2$, and tensile coil spring 25 which urges supporting member 23 so that supporting member 23 turns in the direction of arrow $b_2$.

Barcode reading mechanism 13 also has, as shown in FIGS. 2 and 5, roller 27 provided so as to be rotatable on rotation shaft 27a on the bottom side of mount member 22, and path 28 in which inclined surface 28b on which roller 27 moves as an optical axis moving means.

Figure 9:
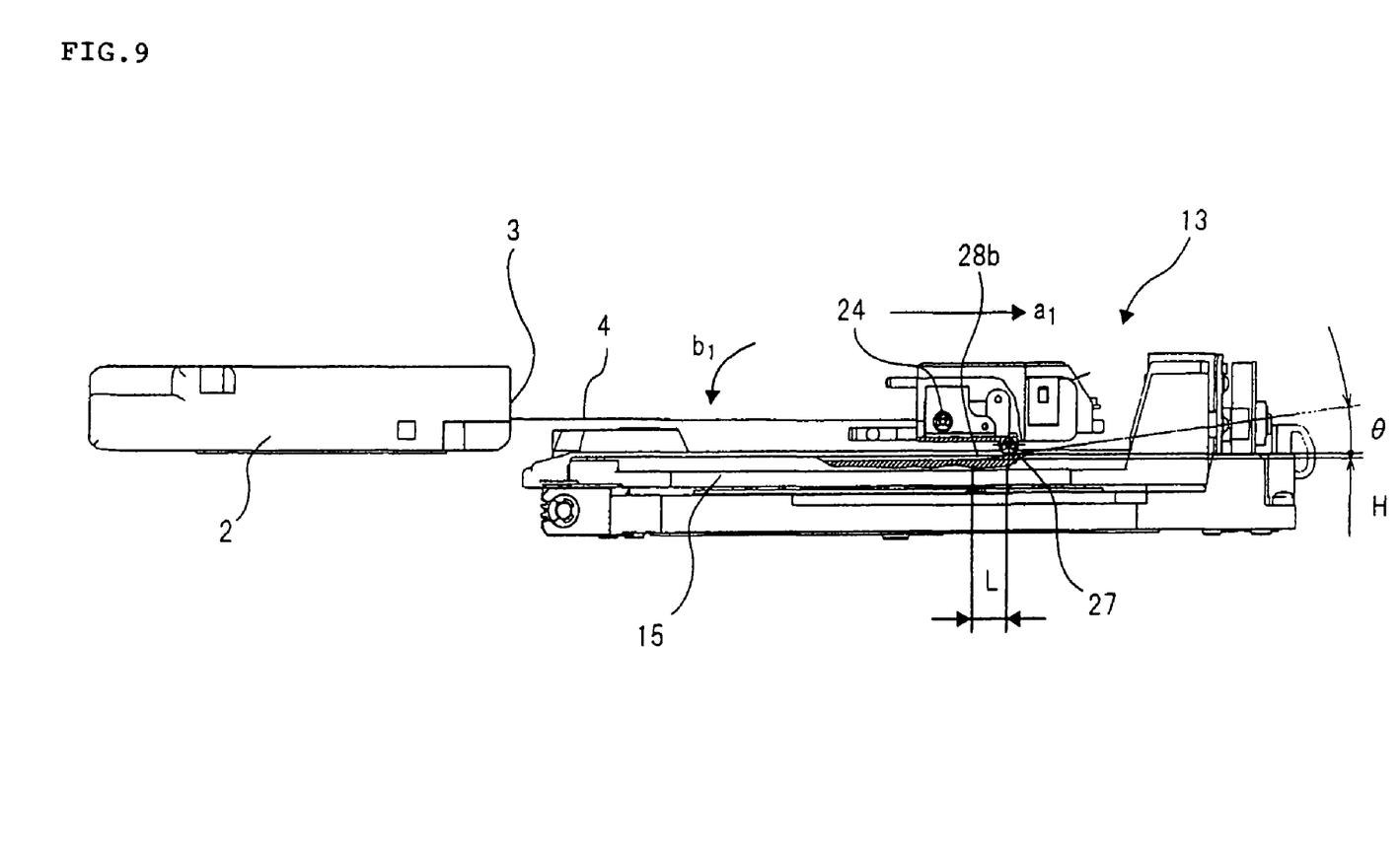
FIG. 9 is still another side view for explaining the operation of the barcode reading mechanism.

That is, roller 27 is provided integrally with reading unit 21 fixed on mount member 22. Path 28 is formed on support base 15 in a straight direction perpendicular to the attachment surface of the barcode label of the magnetic tape cartridge. Path 28 has flat surface 28a parallel to a horizontal direction and inclined surface 28b formed continuously with flat surface 28a. For example, inclined surface 28b is formed so that, as shown in FIG. 9, the angle of tilt θ from flat surface 28a is about 7.8 degrees, distance L along the horizontal direction is about 5 mm and height H in the vertical direction is about 0.7 mm. Reading unit 21 is turned about rotating shaft 24 by the movement of roller 27 along inclined surface 28b of path 28. The optical axis of irradiation light from reading unit 21 is thereby swung by about 3 degrees, for example.

As shown in FIGS. 3 and 4, reading unit 21 is placed on feed block 14 and has light receiving portion 21a for receiving reflected light of irradiation light from the barcode, and light emitting portion 21b in which a light source which emits irradiation light to the barcode is provided. The optical axis of irradiation light applied by light emitting portion 21b to the barcode is tilted upward along a vertical direction so as to form a tilting angle of several degrees from a direction perpendicular to the attachment surface of the barcode label, i.e., the surface on which the barcode is placed, in order to prevent occurrence of a barcode read error. The position of light emitting portion 21b is regulated by top lid member 19 shown in FIG. 1 so that the optical axis of irradiation light is stopped in a state of being tilted vertically upwardly to the desired tilting angle, with roller 27 pressed on path 28 against the urging force of tensile coil spring 25.

Mount member 22 has mount portion 22a on which reading unit 21 is mounted and a pair of supporting projections 22b turnably supported by rotating shaft 24 on supporting member 23. Supporting shaft 22c with which one end of tensile coil spring 25 is engaged is also provided on mount member 22.

Supporting member 23 has supporting portion 23a which having a U-shaped section, and on which supporting projections 22b of mount member 22 are turnably supported by rotating shaft 24. Fixing portions 23b for fixing on feed block 14 are also provided on supporting member 23 respectively at opposite ends of supporting portion 23a. A supporting shaft 23c with which one end of tensile coil spring 25 is engaged is also provided on supporting member 23.

Tensile coil spring 25 has its one end fixed on supporting shaft 22c of mount member 22 and has the other end fixed on supporting shaft 23c of supporting member 23. Tensile coil spring 25, by its urging force, turns reading unit 21 in the direction of arrow $b_2$ around rotating shaft 24.

Support base 15 is provided so as to be movable in the X-axis direction and in the Y-axis direction by the biaxial drive mechanism (not shown). Block moving mechanism 16 provided as a moving mechanism for moving reading unit 21 relative to support base 15 has, as shown in FIG. 2, a drive motor 16a, drive gears 16c and 16d driven and rotated by pinion 16b on drive motor 16a, and feed shaft 16e driven and rotated by drive gear 16d to move feed block 14.

The operation to handle the magnetic tape cartridge in the tape library apparatus of the present exemplary embodiment constructed as described above will be briefly described.

The barcode labels on each of the magnetic tape cartridge housed in the cartridge rack are read with barcode reading mechanism 13 in the tape library apparatus.

The operation of cartridge handling mechanism 11 by the biaxial drive mechanism is such that, for example, reading of the barcode labels on all the magnetic tape cartridges from the housing section at the upper level corner to the housing section at the lower level corner of the cartridge rack is first performed to detect the position of the desired cartridge from among the magnetic tape cartridges.

After detecting the position of the desired cartridge from among the magnetic tape cartridges, the tape library apparatus sets cartridge handling mechanism 11 at the position at which cartridge handling mechanism 11 faces the desired one of the magnetic tape cartridges, takes the magnetic tape cartridge out of the cartridge rack by using cartridge holding mechanism 12, and transports the magnetic tape cartridge to a recording/reproduction apparatus (not shown).

The operation to read the barcode labels attached to each of the magnetic tape cartridges in the cartridge rack will be described with respect to barcode reading mechanism 13 provided in the tape library apparatus.

Cartridge handling mechanism 11 is first moved to each housing section in the cartridge rack by the biaxial drive mechanism to move barcode reading mechanism 13 to the position at which barcode reading mechanism 13 faces the barcode label on each of the magnetic tape cartridges in the housing section.

Subsequently, barcode reading mechanism 13 in the present exemplary embodiment reads the barcode two or more times by scanning the barcode with irradiation light along the bar arrangement direction. This scanning is performed by biaxial drive mechanism moving support base 15 in the Y-axis direction and by changing the position of barcode reading mechanism 13 along the bar length direction of the barcode, i.e., the Y-axis direction, with respect to the barcode label on the magnetic tape cartridge. If groups of read data, that have been obtained by reading the bar label twice, coincide with each other, the read data on the barcode will be identified. Description will be made below by assuming that barcode reading mechanism 13 performs the reading operation three times.

In a case where the optical axis of irradiation light from reading unit 21 is tilted upward along a vertical direction in the conventional barcode reading mechanism, when the barcode on the magnetic tape cartridge in one housing section in a lower level in the vertical direction (Y-axis direction) of the cartridge rack is read, there is a need to move the reading unit to a deviating position below the barcode label in the bar length direction of the barcode for reading at three different positions in the bar length direction of the barcode. This is a cause of an increase in the overall size of the apparatus.

Similarly, in a case where the optical axis of irradiation light from the reading unit is tilted downward along a vertical direction in the conventional barcode reading mechanism, when the barcode on the magnetic tape cartridge in one housing section in an upper level in the vertical direction of the cartridge rack is read, there is a need to move the reading unit to a deviating position above the barcode label in the bar length direction of the barcode for reading at three different positions in the bar length direction of the barcode. This is a cause of an increase in overall size of the apparatus.

In barcode reading mechanism 13 in the present exemplary embodiment, only the optical axis of irradiation light from reading unit 21 is moved in the bar length direction of the barcode while reading unit 21 is stopped in the vertical direction. The overall size of the apparatus can be reduced in this way.

The operation when the barcode on the magnetic tape cartridge in one housing section in the lower level of the cartridge rack is read in the present exemplary embodiment in which the optical axis of irradiation light from reading unit 21 is tilted upward along a vertical direction will be described by way of example with reference to the drawings.

Figure 6:
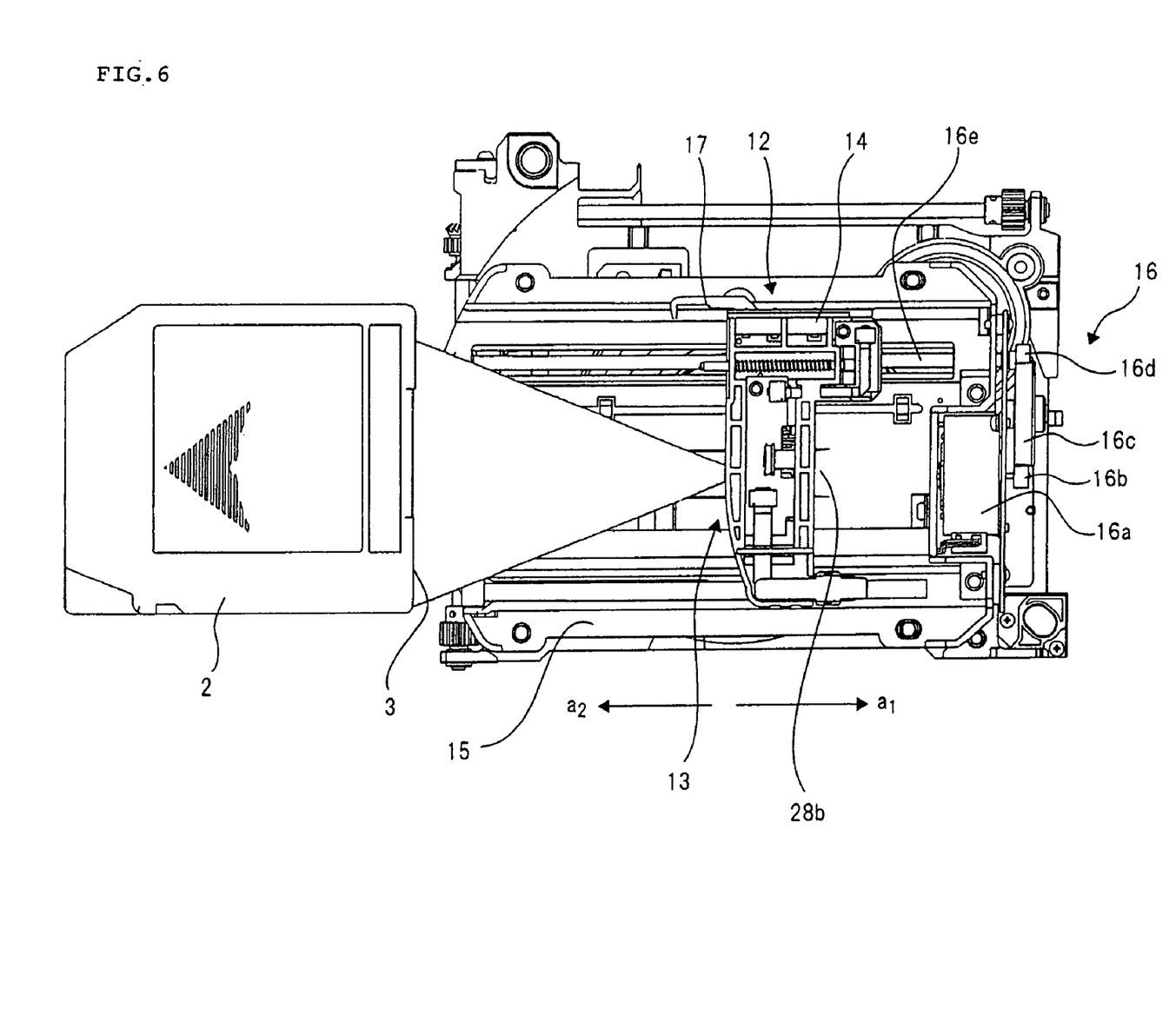
FIG. 6 is a plan view for explaining the operation of the barcode reading mechanism.
Figure 7:
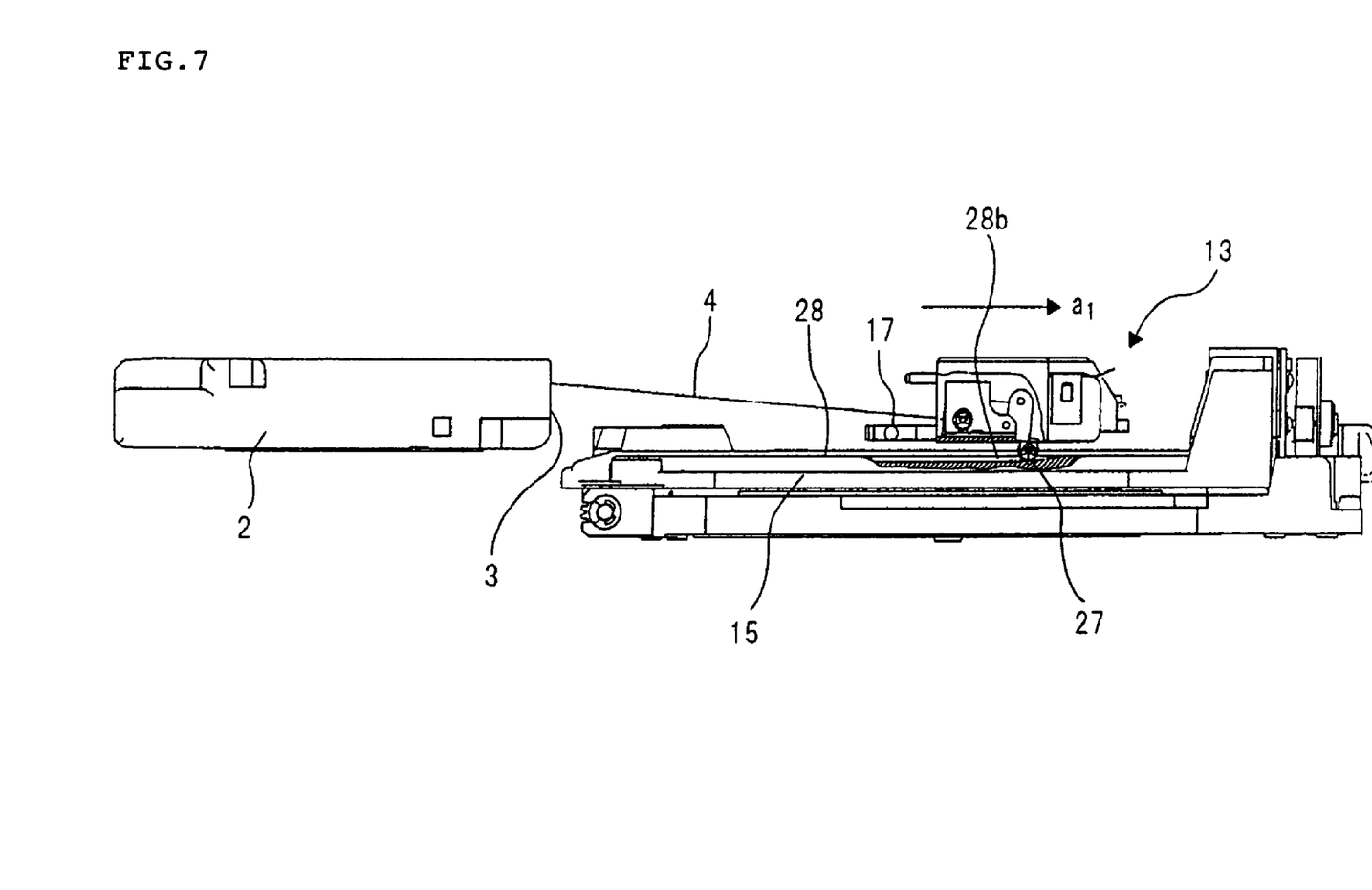
FIG. 7 is a side view for explaining the operation of the barcode reading mechanism.

As shown in FIGS. 6 and 7, support base 15 is first moved along the Y-axis direction by the biaxial drive mechanism to move barcode reading mechanism 13 to the position at which barcode reading mechanism 13 faces barcode label 3 on magnetic tape cartridge 2 housed in the housing section in the lower level of the cartridge rack. At this reading start position, roller 27 in barcode reading mechanism 13 is positioned on inclined surface 28b of path 28 and reading unit 21 applies irradiation light to barcode label 3 on magnetic tape cartridge 2 and obtains first-time read data.

Figure 8:
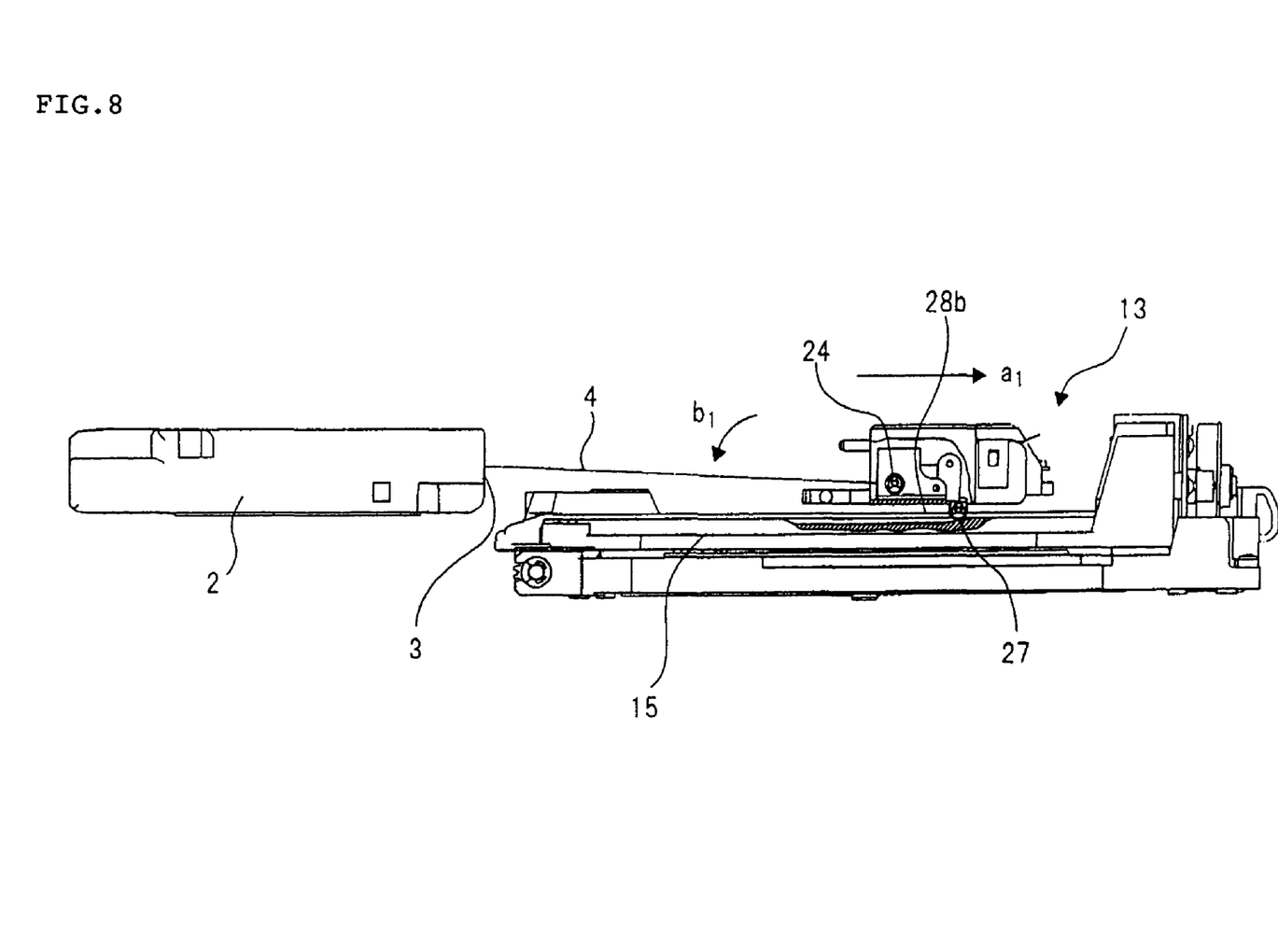
FIG. 8 is another side view for explaining the operation of the barcode reading mechanism.

Subsequently, as shown in FIG. 8, feed block 14 is moved in the direction of arrow $a_1$ by block moving mechanism 16 to move roller 27 of barcode reading mechanism 13 on inclined surface 28b of path 28 in the direction of arrow $a_1$. With this movement, reading unit 21 in barcode reading mechanism 13 is turned in the direction of arrow $b_1$ around rotating shaft 24 to move the position of optical axis 4 of irradiation light from reading unit 21 downward in the bar length direction of the barcode. At this irradiation position, second-time barcode read data is obtained by reading unit 21.

Subsequently, as shown in FIG. 9, feed block 14 is further moved in the direction of arrow $a_1$ by block moving mechanism 16 to further move roller 27 of barcode reading mechanism 13 on inclined surface 28b of path 28 in the direction of arrow $a_1$. With this movement, reading unit 21 in barcode reading mechanism 13 is further turned in the direction of arrow $b_1$ around rotating shaft 24 to move the position of optical axis 4 of irradiation light from reading unit 21 downward in the bar length direction of the barcode. At this irradiation position, third-time barcode read data is obtained by reading unit 21.

Thus, in barcode reading mechanism 13, roller 27 is moved on inclined surface 28b of path 28 by the movement of feed block 14 driven by block moving mechanism 16, and optical axis 4 of irradiation light from reading unit 21 is thereby moved in the bar length direction of the barcode to read the barcode.

Also, feed block 14 is moved in the direction of arrow $a_2$ by block moving mechanism 16 to move roller 27 on inclined surface 28b of path 28 in the direction of arrow $a_2$ and to turn reading unit 21 in the direction of arrow $b_2$ by the urging force of tensile coil spring 25. Reading unit 21 is thereby returned to the above-mentioned reading start position.

As described above, barcode reading mechanism 13 has roller 27 moved on inclined surface 28b of path 28 to turn reading unit 21 around rotating shaft 24. The position of optical axis 4 of irradiation light from reading unit 21 is thereby moved in the bar length direction of the barcode, to enable barcode reading. Thus, barcode reading mechanism 13 requires no adjusting operation for the optical axis of irradiation light such as that using an adjusting plate in the related art.

Also, barcode reading mechanism 13 is designed so as to avoid increasing the amount of movement of cartridge handling mechanism 11 along the Y-direction, i.e., the bar length direction of the barcode on magnetic tape cartridge 3. Barcode reading mechanism 13 can therefore be reduced in size in the Y-axis direction. With barcode reading mechanism 13, therefore, the size of the tape library apparatus can be reduced.

The barcode reading mechanism in the present exemplary embodiment has been described with respect to application to an arrangement for reading a barcode on a barcode label attached to an item represented by a magnetic tape cartridge. However, needless to say, the barcode reading mechanism can also be applied, for example, to a case where a barcode is printed on an item.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

What is claimed is:

1. A barcode reading mechanism, comprising:
   a reading unit including a light emitting portion for irradiating a barcode with irradiation light and a light receiving portion for receiving reflected light of the irradiation light from the barcode;
   a supporting member for turnably supporting the reading unit so that a position of an optical axis of the irradiation light is moved in a bar length direction of a plurality of bars constituting the barcode;
   an optical axis moving mechanism for moving the optical axis of the irradiation light in the bar length direction by turning the reading unit;
   a support base which supports the reading unit so that the reading unit is movable in a direction perpendicular to a surface on which the barcode is placed; and
   a block moving mechanism which moves the reading unit relative to the support base,
   wherein the barcode reading mechanism further comprises a tensile coil spring connecting the reading unit to the supporting member, and
   wherein the optical axis moving mechanism includes a roller provided integrally with the reading unit and a slanting surface which is formed on the support base and along which the roller is moved.

2. The barcode reading mechanism according to claim 1, wherein a path having the slanting surface is formed on the support base linearly in a direction perpendicular to the surface on which the barcode is placed.

3. A barcode reading mechanism, comprising:
   a reading unit including a light emitting portion for irradiating a barcode with irradiation light and a light receiving portion for receiving reflected light of the irradiation light from the barcode;
   means for turnably supporting the reading unit so that a position of an optical axis of the irradiation light is moved in a bar length direction of a plurality of bars constituting the barcode;
   means for moving the optical axis of the irradiation light in the bar length direction by turning the reading unit:
   a support base which supports the reading unit so that the reading unit is movable in a direction perpendicular to a surface on which the barcode is placed; and
   a moving mechanism which moves the reading unit relative to the support base,
   wherein the barcode reading mechanism further comprises a tensile coil spring connecting the reading unit and the means for turnably supporting the reading unit, and
   wherein the means for moving the optical axis includes a roller provided integrally with the reading unit and a slanting surface which is formed on the support base and along which the roller is moved.

4. The barcode reading mechanism according to claim 3, wherein a path having the slanting surface is formed on the support base linearly in a direction perpendicular to the surface on which the barcode is placed.

5. A barcode reading mechanism comprising:
   a reading unit including a light emitting portion for irradiating a barcode with irradiation light and a light receiving portion for receiving reflected light of the irradiation light from the barcode;
   a supporting member for turnably supporting the reading unit so that a position of an optical axis of the irradiation light is moved in a bar length direction of a plurality of bars constituting the barcode; and
   an optical axis moving mechanism for moving the optical axis of the irradiation light in the bar length direction by turning the reading unit,
   wherein the barcode reading mechanism further comprises a tensile coil spring connecting the reading unit to the supporting member,
   wherein the barcode reading mechanism further comprises a mount member for mounting the reading unit, and
   wherein the supporting member supports the mount member by a rotating shaft.

6. A barcode reading mechanism comprising:
   a reading unit including a light emitting portion for irradiating a barcode with irradiation light and a light receiving portion for receiving reflected light of the irradiation light from the barcode;
   a supporting member for turnably supporting the reading unit so that a position of an optical axis of the irradiation light is moved in a bar length direction of a plurality of bars constituting the barcode; and
   an optical axis moving mechanism for moving the optical axis of the irradiation light in the bar length direction by turning the reading unit,
   wherein the barcode reading mechanism further comprises a tensile coil spring connecting the reading unit to the supporting member,
   wherein the barcode reading mechanism further comprises a mount member for mounting the reading unit, and
   wherein the tensile coil spring connects the reading unit to a supporting shaft on the support member via a supporting shaft on the mount member.

7. A barcode reading mechanism, comprising:
   a reading unit including a light emitting portion for irradiating a barcode with irradiation light and a light receiving portion for receiving reflected light of the irradiation light from the barcode;
   a supporting member for turnably supporting the reading unit so that a position of an optical axis of the irradiation light is moved in a bar length direction of a plurality of bars constituting the barcode;
   an optical axis moving mechanism for moving the optical axis of the irradiation light in the bar length direction by turning the reading unit; and
   a mount member where the reading unit is mounted,
   wherein the barcode reading mechanism further comprises a tensile coil spring connecting the reading unit to the supporting member,
   wherein the supporting member is affixed on a feed block, and
   wherein the supporting member supports the mount member at a rotating shaft.

8. The barcode reading mechanism according to claim 7, further comprising a support base on which the feed block is located, wherein, if the feed block is moved along an inclined surface on the support base in a direction away from the barcode, a roller located on the mount member forces the reading member to pivot with the mount member about the rotating shaft.

9. The barcode reading mechanism according to claim 8, wherein the tensile coil spring connects the reading unit to the supporting member via a mount member for mounting the reading unit, and wherein an end of the tensile coil spring is fixed on a supporting shaft of the mount member, and another end of the tensile coil spring is fixed on a supporting shaft of the supporting member.

10. A barcode reading mechanism, comprising:

a reading unit including light emitting portion for irradiating a barcode with irradiation light and a light receiving portion for receiving reflected light of the irradiation light from the barcode;

a supporting member for turnably supporting the reading unit so that a position of an optical axis of the irradiation light is moved in a bar length direction of a plurality of bars constituting the barcode; and an optical axis moving mechanism for moving the optical axis of the irradiation light in the bar length direction by turning the reading unit, wherein the barcode reading mechanism further comprises a tensile coil spring connecting the reading unit to the supporting member, and wherein the reading unit is mounted on a mount member, and the mount member is connected to the supporting member via the tensile coil spring and a rotating shaft.

11. The barcode reading mechanism according to claim 10, wherein the supporting member is connected to a feed block located on a support base, the feed block adapted to move along an inclined surface on the support base, and wherein the mount member is adapted to rotate about the rotating shaft, if the feed block is moved along the inclined surface on the support base.

* * * * *